United States Patent
Cox et al.

(10) Patent No.: US 11,142,306 B2
(45) Date of Patent: *Oct. 12, 2021

(54) METHOD FOR ADDING VALUE TO OPERATION OF LONG HAUL AIRCRAFT

(71) Applicants: Borealis Technical Limited, North Plains, OR (US); Joseph J. Cox, Portland, OR (US); Isaiah W. Cox, London (GB); Rodney T. Cox, North Plains, OR (US)

(72) Inventors: Joseph J. Cox, Portland, OR (US); Isaiah W. Cox, London (GB); Rodney T. Cox, North Plains, OR (US)

(73) Assignee: Borealis Technical Limited, Isle of Man (IM)

( * ) Notice: Subject to any disclaimer, the term of this patent is extended or adjusted under 35 U.S.C. 154(b) by 243 days.

This patent is subject to a terminal disclaimer.

(21) Appl. No.: 14/773,860

(22) PCT Filed: Mar. 10, 2014

(86) PCT No.: PCT/US2014/022878
§ 371 (c)(1),
(2) Date: Sep. 9, 2015

(87) PCT Pub. No.: WO2014/164575
PCT Pub. Date: Oct. 9, 2014

(65) Prior Publication Data
US 2016/0016659 A1    Jan. 21, 2016

Related U.S. Application Data

(60) Provisional application No. 61/775,574, filed on Mar. 9, 2013.

(51) Int. Cl.
*B64C 25/32* (2006.01)
*B64F 1/22* (2006.01)
(Continued)

(52) U.S. Cl.
CPC ............ *B64C 25/405* (2013.01); *B64F 1/228* (2013.01); *G06Q 10/06* (2013.01);
(Continued)

(58) Field of Classification Search
CPC ..... B64C 25/405; B64F 1/26; G06Q 10/0631; G06Q 10/06313
See application file for complete search history.

(56) References Cited

U.S. PATENT DOCUMENTS 6,305,484 B1   10/2001  Leblanc
6,657,334 B1   12/2003  Edelson
(Continued)

OTHER PUBLICATIONS

Electric Taxiing Systems Make Development Progress Aviation Week & Space Technology, Feb. 20, 2012 http://aviationweek.com/awin/electric-taxiing-systems-make-development-progress.*
(Continued)

*Primary Examiner* — Joseph W Sanderson (57) ABSTRACT

A method is provided for adding available takeoff and landing slots when aircraft designed for long haul flight are moved quietly and efficiently on the ground without operation of aircraft engines at airports with slot controls and airports that are constrained from operation at certain times by curfews that limit operating hours for these long haul aircraft. Long haul aircraft are powered and driven by onboard non-engine drive means or moved manually or automatically by tugs, tow vehicles, or other transfer apparatus to arrive at a runway before expiration of a morning curfew and to be ready for takeoff as soon as curfew is lifted. Long haul aircraft may land immediately before an evening curfew starts and to move without engines to an airport arrival location after evening curfew starts, effectively expanding and increasing the number of available takeoff and landing slots for long haul aircraft.

1 Claim, 3 Drawing Sheets

(51) Int. Cl.
*G08G 5/00* (2006.01)
*G06Q 10/06* (2012.01)
*B64C 25/40* (2006.01)

(52) U.S. Cl.
CPC ..... *G06Q 10/06313* (2013.01); *G08G 5/0065* (2013.01); *Y02T 50/80* (2013.01)

(56) References Cited

U.S. PATENT DOCUMENTS

| | | | |
|---|---|---|---|
| 6,789,011 | B2 | 9/2004 | Baiada et al. |
| 6,838,791 | B2 | 1/2005 | Edelson |
| 7,116,019 | B2 | 10/2006 | Edelson |
| 7,340,405 | B1 * | 3/2008 | Gunther ............... G06Q 10/025 705/6 |
| 7,445,178 | B2 | 11/2008 | McCoskey et al. |
| 7,469,858 | B2 | 12/2008 | Edelson |
| 7,891,609 | B2 | 2/2011 | Cox |
| 7,975,959 | B2 | 7/2011 | Perry et al. |
| 7,975,960 | B2 | 7/2011 | Cox |
| 2006/0273686 | A1 | 12/2006 | Edelson et al. |
| 2009/0089789 | A1 | 4/2009 | Faltings et al. |
| 2013/0138584 | A1 * | 5/2013 | Vana ...................... G06Q 90/00 705/500 |
| 2015/0217872 | A1 * | 8/2015 | Cox ........................ B64F 1/228 414/800 |
| 2015/0239577 | A1 * | 8/2015 | Lowe ...................... B64F 1/00 244/114 R |

OTHER PUBLICATIONS

WheelTug Wikipedia, Mar. 6, 2012 https://en.wikipedia.org/w/index.php?title=WheelTug&oldid=480497147#cite_note-1.*

Featured Maps: DCA Perimeter Rule (Jul. 8, 2010) Swartz, Karl L., Jul. 8, 2010 http://www.gcmap.com/featured/20100708.*

Initial testing is completed with the "Taxibot" tractor for airport aircraft movements Airbus, Jun. 16, 2010 http://www.airbus.com/newsevents/news-events-single/detail/initial-testing-is-completed-with-the-taxibot-tractor-for-airport-aircraft-movements/.*

Ricardo develops airplane taxi bot to reduce emissions, noise Jonathon Ramsey, Nov. 21, 2009, Autoblog http://www.autoblog.com/2009/11/21/ricardo-develops-airplane-taxi-bot-to-reduce-emissions-noise/.*

Longest Flight Wikipedia, retrieved Apr. 11, 2017 https://en.wikipedia.org/wiki/Longest_flights.*

Thousands grounded as 'snow plan' at Heathrow fails again Simon Calder, Feb. 6, 2012, The Independent http://www.independent.co.uk/news/uk/home-news/thousands-grounded-as-snow-plan-at-heathrow-fails-again-6579586.html.*

Heathrow night flights proposed Andrew Parker, Apr. 9, 2012, Financial Times https://www.ft.com/content/7777db18-7cb8-11e1-8a27-00144feab49a?mhq5j=e1.*

Night Flying Restrictions at Heathrow, Gatwick and Stansted Stage 1 Consultation Dept. for Transport, Jan. 2013.*

On the Soapbox: Isaiah Cox of WheelTug Cox, Isaiah, Jul. 1, 2013, The Business Travel News https://www.btnews.co.uk/article/6482.*

Dubois, Thierry. "Electric Taxiing Could Be A Green And Economic Option" Aviation International News | Business, Air Transport, Defense & General Aviation News. Feb. 10, 2012. http://www.ainonline.com/aviation-news/air-transport/2012-02-10/electric-taxiing-could-be-green-and-economic-option.*

Airport Slots—The Building Blocks of Air Travel, www.iata.org/pressroom/airlines-international/august-2010.

Teixeira, "An heuristic approach for the improvement of aircraft departure scheduling at airports." [online] published Mar. 1992. [retrieved by ISR committee on Nov. 19, 2014] Retrieved from the Internet<https://dspace.lboro.ac.uk/dspace-jspui/handle/2134/12617>.

Abeyratne. Management of airport congestion through slot allocation. [online] Journal of Air Transport Management 6 (2000) p. 29-41 [Retrieved by ISR committee on Nov. 19, 2014] Retrieved from the Internet <http://www.sciencedirect.com/science/article/pii/S0969699799000198>.

* cited by examiner

```
AIRLINE IS ALLOCATED TAKEOFF AND LANDING SLOTS FOR ROUTINELY OPERATING
LONG HAUL AIRCRAFT AND LONG HAUL WIDEBODY AIRCRAFT FLYING FLIGHTS
OVER 6 HOURS IN LENGTH BY AN AIRPORT WHERE DEMAND EXCEEDS AIRPORT
INFRASTRUCTURE CAPACITY FOR INCREASING LONG HAUL TAKEOFFS AND
LANDINGS AND THE AIRPORT CURFEW PERIOD LIMITS THE AIRLINE'S OPERATION
TIME FOR LONG HAUL AND LONG HAUL WIDEBODY AIRCRAFT
          ↓
AIRLINE DESIRES TO ADD ADDITIONAL TAKEOFF AND LANDING SLOTS TO THE
ROUTINE TAKEOFF AND LANDING SLOTS ALLOCATED BY THE LIMITED CAPACITY
AND CURFEW-CONTROLLED AIRPORT
          ↓
AIRLINE EQUIPS THE LONG HAUL OR LONG HAUL WIDEBODY AIRCRAFT FOR WHICH
ADDITIONAL TAKEOFF AND LANDING SLOTS ARE DESIRED TO MOVE ON THE GROUND
WITHOUT OPERATING ENGINES DURING THE AIRPORT CURFEW PERIOD BEFORE
TAKEOFF AND AFTER LANDING AT THE AIRPORT BY LANDING GEAR WHEEL-MOUNTED
DRIVE MOTORS OR BY AIRCRAFT TRANSFER APPARATUS
          ↓
AIRLINE MOVES EACH OF THE LONG HAUL OR LONG HAUL WIDE BODY AIRCRAFT
EQUIPPED TO MOVE WITHOUT OPERATING ENGINES ON THE GROUND DURING THE
AIRPORT CURFEW PERIOD WHEN GROUND MOVEMENT, DEPARTURES, AND
ARRIVALS ARE NOT PERMITTED AT THE AIRPORT
       ↓                                    ↓
AIRLINE MOVES EQUIPPED                AIRLINE MOVES EQUIPPED
LANDING LONG HAUL OR LONG             DEPARTING LONG HAUL OR LONG
HAUL WIDEBODY AIRCRAFT FROM           HAUL WIDEBODY AIRCRAFT FROM
LANDING LOCATIONS TO PARKING          PARKING LOCATIONS TO TAKEOFF
LOCATIONS DURING THE AIRPORT          LOCATIONS DURING THE AIRPORT
CURFEW PERIOD AND ADDS AN             CURFEW PERIOD AND ADDS A
ARRIVAL SLOT TO THE ROUTINE           TAKEOFF SLOT TO THE ROUTINE
ARRIVAL SLOTS ALLOCATED TO            TAKEOFF SLOTS ALLOCATED TO THE
THE AIRLINE FOR EACH EQUIPPED         AIRLINE FOR EACH EQUIPPED LONG
LONG HAUL AND LONG HAUL               HAUL OR LONG HAUL WIDEBODY
WIDEBODY AIRCRAFT LANDING             AIRCRAFT MOVED ON THE
BEFORE THE CURFEW PERIOD AND          GROUND WITHOUT OPERATING
MOVED ON THE GROUND                   ENGINES DURING THE CURFEW
WITHOUT OPERATING ENGINES             PERIOD AND TAKING OFF AFTER
DURING THE CURFEW PERIOD              THE CURFEW PERIOD
```

METHOD FOR ADDING VALUE TO OPERATION OF LONG HAUL AIRCRAFT

PRIORITY CLAIM

This application claims priority from U.S. Provisional Patent Application No. 61/775,574, filed Mar. 9, 2013, the disclosure of which is fully incorporated herein.

TECHNICAL FIELD

The present invention relates generally to increasing the value of aircraft to an airline and, specifically, to a method for adding value to the operation of an airline's long haul aircraft through increasing the number of long haul slots available for long haul aircraft at an airport.

BACKGROUND OF THE INVENTION

In this era of increased air travel, many airports have reached their capacity to accommodate the numbers of aircraft seeking to use them. Delays in taking off and landing have increased as air traffic has increased to meet the demand for air travel. At some airports, the demand for runway and gate access exceeds the supply, which has resulted in the allocation of both takeoff and landing slots and gates. The number of flights an airport can handle in a given time period is fixed, and these resources are allocated to airlines to ensure that runway and gate access is maximized and delays are minimized. The allocation of takeoff and landing slots and gate access to airlines was instituted to control air traffic into and out of busy airports. This system was instituted in an effort to eliminate, or at least control and reduce, excessive and costly time delays, as well as to expand an airport's limited capacity. Some less busy airports have instituted takeoff slot and landing slot controls only during peak usage times.

There are currently over 150 airports around the world, almost 100 in Europe alone, where demand exceeds airport capacity, and, as a result, takeoff slots and landing slots are allocated to the airlines that routinely take off and land at these airports. In many of these airports, gates at terminals, which are generally rented from airport owners under long term leases, are also at a premium, and the leases are bought and sold among airlines. The United States currently has only three takeoff and landing slot-controlled airports and four others where takeoff slots are allocated during peak hours. Terminal gates are also at a premium in these airports. The numbers of available takeoff slots, landing slots, and gates are generally limited, and some airlines have takeoff slots, landing slots, and terminal gate rights that have been "grandfathered" for historical reasons. To schedule departures and/or arrivals out of takeoff or landing slot-controlled airports, airlines must acquire the necessary gates and takeoff and landing slots before they can use these airports. If the airport is one that does not have a shortage of gates or takeoff and landing slots, an airline can acquire the necessary slots fairly easily. If, however, the airport has no gates or takeoff or landing slots available, obtaining these required resources presents challenges for an airline. Airlines that fly long haul flights, which are usually international flights, may also have challenges obtaining landing slots at airports with facilities that can accommodate such aircraft and also provide international air travel services.

Slot management systems have been proposed, as have methods and systems for allocating airport slots. U.S. Pat. No. 6,789,011 to Baiada et al and U.S. Patent Application Publication No. US2009/0089789 to Faltings et al, for example, describe such systems. Airlines are generally not in favor of such systems, and a need for a slot management system has been referred to as indicative of a failure to take the steps needed to keep up with air travel demand. However, airlines have invested billions of dollars in aircraft and must have the degree of certainty provided by takeoff and landing slots and airport terminal gates to support these investments, as well as to ensure that airlines' access to airports continues into the future.

Airlines presently consider their gates and takeoff and landing slots airline property and would like to be free to use these slots as they desire. Such gates and takeoff and landing slots generally have a monetary value, and airlines sell and lease them as they would any other asset. Some economists and others view the current system as anti-competitive and urge that airlines with grandfathered gates and congested peak time takeoff and landing slots may have an unfair advantage, especially when airlines operate flights primarily to guard their slots and keep out competitors. This view has apparently not affected the market for slots. At some airports, London Heathrow, for example, gates and takeoff slots are in great demand, and slots generally sell for about US$3 million or more each. Very desirable gates and takeoff slots may command even higher prices. Gates and takeoff or landing slots tend to be transferred on a yearly basis, with the original putative owner retaining underlying ownership and the ability to resell these same gates and takeoff or landing slots.

New takeoff and landing slots, especially at busy airports, seldom become available, and both new airlines and established airlines that want to expand their services to these airports may have limited or no access to slots. If, under some arrangements, an airline does not use an allocated gate or a takeoff or landing slot 80% of the time, the airline risks losing them, and another airline could acquire the gate or the takeoff or landing slot, but this is not a reliable way to obtain a gate or a takeoff or landing slot. Since airlines may swap and exchange gates and takeoff and landing slots among themselves, a gate or a takeoff or landing slot might be acquired in this manner. Takeoff and landing slots may also be acquired at auction. The International Air Transport Association (IATA) has suggested that when new takeoff and landing slots become available, they could be put into a slot pool, with a portion of the slots required to be made available to new entrant carriers that are currently operating with a small number of slots, for example, on the order of less than two pairs of slots per day. A single gate may be used in connection with many takeoff slots and/or landing slots, and an airline's acquisition of gates is not necessarily tied to the airline's acquisition of takeoff or landing slots. Takeoff and landing slots are limited to the number of runways at an airport and separation distances allowed between aircraft.

The majority of slots at most airports are taken by airlines with aircraft that fly short haul flights of 3 hours or less and/or medium haul flights of 3 to 6 hours. Aircraft that fly long haul flights that are greater than 6 hours typically operate internationally to carry a larger number of passengers than is carried by short or medium haul aircraft. There are fewer long haul flights, but that situation appears to be changing as airlines add new widebody aircraft designed to fly long haul flights efficiently to meet an increased demand for the international air travel that requires long haul flights. The international airports that can accommodate the widebody aircraft most economically used for long haul flights, such as, for example, London Heathrow, also accommodate large numbers of shorter haul flight aircraft. Few of these airports have the capability for physically expanding numbers of gates and other airport facilities. Consequently, the value of a slot at a crowded airport, for example London Heathrow, for a long haul aircraft can exceed US$23 million, which is significantly greater than the current estimated US$3 million for a short haul slot. Increasing the number of long haul slots can present significant economic challenges for an airline that wants to expand its long haul flight capability.

At most airports, therefore, an airline can only increase its takeoff and landing slots or gates by the re-allocation of existing resources. The addition of new takeoff slots and landing slots and the more intensive use of gates is not easily accomplished. While new takeoff and landing slots and increased gate use could be achieved by expanding airport capacity for accommodating long haul aircraft, few, if any, airports where long haul flights presently land can expand their capability for servicing additional international flights. Even when the physical expansion of airport facilities for handling long haul flights is possible, it could be decades before the requisite regulatory approvals needed are obtained and construction of the infrastructure expansion required to increase takeoff and landing slots and add gates is completed. Even if the necessary regulatory approvals could be obtained easily and quickly, which is rarely the case, the addition of new runways, new taxiways, and new terminal gates, especially those able to accommodate large long haul aircraft, is very expensive.

Expanding the airport operating time could produce new takeoff and landing slots. Many of the world's major airports have curfews or use restrictions, however, which can drastically reduce airport capacity. About 70% of the airports in Europe are curfew-controlled. India, the United States, and other countries have smaller numbers of curfew-controlled airports. Limitations and restrictions on airport operation can also reduce the value of additional airport infrastructure. Many airports currently do not operate at night or during other selected hours because of curfews. A curfew demands that all takeoffs and landings occur only within a specific time period and prohibits all takeoffs and landings outside this time period. As noted, a large majority of airports in Europe are curfew-controlled, and this is not likely to change. The basis for most curfews is the noise produced by incoming and outgoing aircraft. The reduction of engine emissions is an additional reason for limiting airport operating hours. Aircraft noise becomes an issue when aircraft are required to use engine thrust for ground travel prior to take off and after landing. Even when a tug or tow vehicle is used to push the aircraft back from a gate, the aircraft's engines are still presently required for aircraft ground movement between pushback and takeoff, and this generates significant noise and other pollution. Newer widebody long haul aircraft may have reduced engine emissions and noise, but thrust from the aircraft engines is still required for ground movement.

Moving an aircraft autonomously on the ground without the use of a tug or tow vehicle or relying on thrust from the aircraft's engines has been proposed. For example, U.S. Pat. No. 7,891,609 to Cox et al, owned in common with the present application, describes moving an aircraft along taxiways using at least one self propelled undercarriage wheel to improve turnaround time. Moving an aircraft to a takeoff runway with an automated tug without the use of aircraft engines has also been proposed by Leblanc in U.S. Pat. No. 6,305,484. Neither of these patents, however, suggests a method for actually creating or increasing the number of takeoff and landing slots available at a curfew-controlled or any other airport.

None of the foregoing art suggests a method for creating or increasing long haul slots at a curfew-controlled airport to add value to the operation of long haul aircraft, wherein long haul aircraft are moved on the ground, completely without operation of the aircraft's engines, so that the aircraft can be on the runway ready for takeoff when an airport's curfew restrictions are lifted. Nor is a method for creating slots for long haul aircraft that includes moving a long haul aircraft that has landed immediately at curfew expiration without operation of the aircraft's engines from a touch down location to a parking location suggested by the prior art. Further, the prior art does not suggest the resulting increased long haul slots or long haul slot value created when long haul aircraft are moved in any way on the ground that does not require operation of the aircraft's engines so that aircraft are on the runway ready for takeoff when an airport's curfew restrictions are lifted while the next departing long haul aircraft can be loaded and ready for departure at the same gate from which the first long haul aircraft departed.

The prior art, therefore, fails to suggest a method for adding value to operation of long haul aircraft by increasing the number of takeoff and landing slots available to long haul aircraft at an airport without extending the airport hours of operation, reducing curfew hours, or adding airport infrastructure.

SUMMARY OF THE INVENTION

It is a primary object of the present invention, therefore, to overcome the deficiencies of the prior art and to provide a method for adding value to the operation of long haul aircraft by making available and increasing numbers of takeoff and landing slots at an airport without extending the airport hours of operation, reducing curfew hours, or adding airport infrastructure.

It is another object of the present invention to provide a method for adding value to operation of long haul aircraft by increasing early morning landing slots and take off slots available at an airport when long haul aircraft are moved in any way on the ground that does not require operation of the aircraft's main engines.

It is another object of the present invention to provide a method for adding value to operation of long haul aircraft by increasing early morning landing slots and take off slots available at an airport when long haul aircraft are equipped with non-engine wheel drive means for autonomous ground movement.

It is another object of the present invention to provide a method for adding value to operation of long haul aircraft by increasing early morning landing slots and take off slots available at an airport when long haul aircraft are moved on the ground without by manually or automatically controlled tugs, tow vehicles, or other transfer apparatus without operation of the aircraft's engines.

It is an additional object of the present invention to provide a method for increasing the value of operating long haul aircraft by increasing the number of long haul landing slots available at all times at airports with curfews.

It is a further object of the present invention to provide a method for adding value to operation of long haul aircraft by increasing the number of long haul aircraft arrivals and departures at gates at an airport without increasing airport infrastructure capacity.

It is yet another object of the present invention to provide a method for increasing the value of operating long haul aircraft by increasing long haul takeoff and landing slots and gate usage available to long haul aircraft at airports that are both slot-controlled and curfew-controlled.

The aforementioned objects are achieved by providing a method for adding value to the operation of long haul aircraft when aircraft designed for long haul flight are moved in any way on the ground that does not required operation of the aircraft's engines. Long haul aircraft may be equipped with onboard non-engine wheel drive means controllable move the long haul aircraft autonomously on the ground or long haul aircraft may be moved on the ground by manually or automatically controlled tugs, tow vehicles, or other transfer apparatus. The number of long haul aircraft at airports with slot controls, including airports that are constrained from operation at certain times by curfews that limit the hours when long haul aircraft are able to operate, can be increased significantly. Long haul aircraft with the capability to be moved, or to taxi autonomously, without operating engines can travel quietly and efficiently to a runway to be ready for takeoff as soon as curfew is lifted and right before curfew starts, effectively expanding the number of available long haul slots and increasing the value of long haul aircraft.

Other objects and advantages will be apparent from the following description, drawings, and claims.

BRIEF DESCRIPTION OF THE DRAWING

FIG. 4 is a flow chart with steps of the present method describing increasing slots allocated to an airline for long haul or long haul widebody aircraft flying flights over 6 hours in length by an airport where demand exceeds airport infrastructure capacity for increasing long haul takeoffs and landings and an airport curfew period limits the airline's operation of long haul and long widebody aircraft.

DESCRIPTION OF THE INVENTION

To keep airline schedules operating on time and to reduce delays at airports without the capability for expanding their physical infrastructure or otherwise accommodating additional long haul or other aircraft takeoffs and landings, airports have determined the number of flights, or slots, an airport can handle in a defined period of time and have allocated these slots to airlines. Certain takeoff and landing slots at certain airports and at certain times have become very desirable to airlines, and those takeoff and landing slots are, as a result, very valuable. This is particularly the case for long haul aircraft, which have limited flexibility in their flight schedules because of longer flight times and distances than short and medium haul aircraft. Competition for such slots can be intense, especially at a busy airport such as London's Heathrow, for example, where both takeoff and landing slots at the expiration of morning curfew are in great demand by all airlines. As discussed above, adding new gates, terminal facilities, and runways to accommodate additional takeoff and landing slots to increase the total number of slots at an airport is difficult. This is especially problematic at airports where hours of operation are restricted by curfew, and the likelihood of adding more gates or otherwise increasing infrastructure is, at best, a remote possibility or, more likely, nonexistent.

An airport with a night curfew is prohibited from allowing long haul and other aircraft to land or take off early in the morning and late at night. A night curfew might extend, for example, from 11:00 PM to 6:00 AM. Local noise laws may prevent the operation of an aircraft's engines, whether on the ground or in the air during this time period. Consequently, airlines cannot currently schedule any flights that taxi, land or take off at an airport during the curfew. Aircraft engines must be shut off during the curfew time period, which means that landing has to be completed, and the aircraft must be at a gate with its engines off by the start of curfew. Takeoff must also be completed before the start of curfew. Aircraft engines cannot be started before curfew is lifted and cannot, therefore, be used to move an aircraft to a runway for takeoff. In addition, aircraft landing cannot occur until after curfew has been lifted. The effect of these restrictions is to extend the curfew time period and reduce the potentially available slots, as well as to limit the number of possible aircraft movements at an airport.

The method of the present invention overcomes these challenges and extends the time available for aircraft takeoff and landing, which effectively increases the number of slots available to long haul and other aircraft before the curfew period begins and before it ends. Early morning takeoff slots and late night takeoff or landing slots are especially attractive to many airlines and, consequently, are very valuable. Many long haul flights are scheduled to fly overnight, and late night takeoff slots and late night and early morning landing slots are very attractive to airlines with long haul aircraft that fly this kind of schedule. The numbers of both early morning slots and late evening slots available to an airline's long haul aircraft, and therefore, the value of operating the long haul aircraft, can be increased significantly by the present method as described in the EXAMPLE below.

As discussed above, once an airline obtains a gate and/or a takeoff or landing slot, that gate or slot is an asset that the airline can trade, sell, or lease. Not all airlines with long haul aircraft will be able to take advantage of newly available long haul slots and added value created by the present method, however. These additional long haul slots and added value will be available only to an airline that operates long haul aircraft that can move quietly on the ground without relying on thrust from operation of the main engines and will be able to be at the runway and ready for takeoff immediately when the curfew period has ended or just before the curfew period begins, or is able to land and shut off engines immediately before the curfew period begins. The availability of long haul aircraft that can land just before the curfew period begins and travel to a gate or other parking location without operating aircraft engines enables an airport to add late time long haul slots just before the curfew period starts. These long haul slots are valuable assets that can increase the value of a long haul aircraft, which makes them very desirable to an airline that wants to acquire them.

In accordance with the method of the present invention, to add value to operation of a long haul aircraft, the aircraft must be capable of being moved quietly on the ground by means other than operation of the aircraft's engines. Long haul aircraft may be equipped to be driven autonomously during ground travel by one or more aircraft drive wheels powered by a controllable non-engine or engines-off drive means. These one or more powered drive wheels are uniquely positioned to maneuver an aircraft without engine operation in a variety of ground travel circumstances. A manually operated or an automatically operated tug, tow vehicle, or other transfer apparatus may also be used to move a long haul aircraft during all ground movement, upon landing and prior to takeoff, so that operation of the aircraft's engines is not required. These vehicles are not currently employed to move long haul or other aircraft between runways and gates, and they may be used very effectively for this purpose when aircraft must be moved quietly without engine operation within the time period around curfew.

When a long haul aircraft is equipped with an onboard non-engine drive means for autonomous movement, a preferred non-engine drive means may be hydraulic, pneumatic, electric, or any other type of non-engine drive means that can transfer force through an aircraft wheel to move the aircraft at a desired speed and torque. An onboard non-engine drive means for a powered drive wheel optimally exerts sufficient power to propel or move a long haul aircraft autonomously, quietly, and efficiently at runway speeds without engine operation, and its preferred small size enables the non-engine drive means to fit within a nose wheel or main wheel landing gear space or in any other convenient onboard location.

Equipping a long haul aircraft with one or more controllable onboard non-engine drive means associated with or mounted within one or more of the aircraft wheels that is powered independently of the aircraft's engines to cause one or more of the aircraft's wheels to rotate at a desired speed, or at a torque associated with a desired speed, may provide the requisite power to move a long haul aircraft at the desired speed. One particularly preferred onboard non-engine drive means suitable for this purpose is an electric non-engine drive means that is could be any one of a number of designs, for example an inside-out motor attached to a wheel hub in which the rotor can be internal to or external to the stator, such as that shown and described in U.S. Patent Application Publication No. 2006/0273686, the disclosure of which is incorporated herein by reference. A toroidally-wound motor, an axial flux motor, a permanent magnet brushless motor, a synchronous motor, an asynchronous motor, a pancake motor, a switched reluctance motor, electric induction motor, or any other electric motor geometry or type known in the art is also contemplated to be suitable for use in the present invention.

The non-engine drive means selected, whether electric, hydraulic, pneumatic, or any other type of non-engine drive means, should be able to move an aircraft wheel on an aircraft of the size typically used for long haul flights, for example one of the large widebody models of aircraft available from Boeing and Airbus, at a desired speed and torque during ground travel without operation of the aircraft's engines. One kind of electric drive motor preferred for this purpose is a high phase order electric motor of the kind described in, for example, U.S. Pat. Nos. 6,657,334; 6,838,791; 7,116,019; and 7,469,858, all of which are owned in common with the present invention. A geared motor, such as that shown and described in U.S. Pat. No. 7,469,858, may be designed to produce the torque required to move a commercial sized aircraft, including a long haul widebody aircraft, at an optimum speed for ground movement. The disclosures of the aforementioned patents are incorporated herein by reference. Other motor designs capable of high torque operation across the desired speed range that can move a long haul aircraft wheel at a ground travel speed to produce the quiet ground movement that will increase airport slots according to the present invention could be used and are contemplated to be within the scope of the present invention.

A preferred non-engine or engines-off drive means controllable to move a long haul aircraft on the ground and enable the airline to qualify for increased long haul slots in accordance with the present invention may be specifically designed to be retrofitted on existing long haul aircraft without requiring changes to existing wheel structures, including the brakes, to produce self-propelled drive wheels. A major advantage of the design of this non-engine drive means is achieved by the continued use of the existing tires, axle, and piston already in use on a long haul aircraft. Since these structures are not altered from their original condition or otherwise changed in any way by the installation of the present wheel non-engine drive means assembly, the rim width, tire bead, and bead seat would not require re-certification by the Federal Aviation Administration (FAA) or by other aviation regulatory authorities, thus eliminating a potentially time consuming and costly process. As a result, the non-engine drive means described herein may be particularly well-suited for installation on existing long haul aircraft to make these aircraft especially eligible for long haul slots near the beginning or end of curfew. Additionally, the controls required to operate a non-engine drive means as described herein can also be retrofitted within the existing cockpit controls in a long haul aircraft.

Moving a long haul aircraft on the ground using the non-engine drive means described above requires providing sufficient power to the non-engine drive means to produce a torque capable of driving an aircraft wheel to move the aircraft at a desired ground speed. When an electric non-engine drive means is used, the current, as well as the voltage and frequency of the current, applied to the motor can be controlled to regulate speed as the long haul aircraft is driven quietly on the ground. In an aircraft wheel drive assembly useful in the present invention, current to power the motor most preferably originates with the aircraft auxiliary power unit (APU). Power sources, other than the aircraft engines, could also be used to supplement or replace the APU as a source of power. These power sources can include, for example without limitation, batteries, fuel cells, any kind of solar power, POWER CHIPS™, and burn boxes, as well as any other suitable power source that may enable the non-engine drive means to operate quietly to move a long haul aircraft on the ground. Control of the flow of current to the non-engine drive means, as well as control of the voltage and frequency of the current, allows the torque generated by the non-engine drive means to be controlled and, therefore, the speed of the wheel powered by the non-engine drive means and the ground travel speed of the long haul aircraft can also be controlled.

A long haul aircraft can also be moved on the ground without operation of its engines by the external assistance provided by a tug, tow vehicle, or other transfer apparatus to create long haul slots and add value to long haul aircraft as described herein. Any of the variety of tugs, tow vehicles, and other transfer apparatus available for attachment to aircraft to move them on the ground without engines is contemplated for use with the present method of adding value to the operation of long haul aircraft associated with creating additional long haul slots. Most tow vehicles or tugs presently in use are operator-driven vehicles that may be attached to an aircraft's nose landing gear with a tow bar or are vehicles that do not use a tow bar, but, instead, lift the aircraft's nose landing gear and support it above the ground surface to enable the tug to move the aircraft. Tow vehicles of either of these types will require ground personnel to manually connect and disconnect them to an aircraft and then operate them to move the aircraft. Since such tow vehicles are already widely used at most airports, modifying their use to move long haul aircraft near curfew times and create slots that add value to long haul aircraft in accordance with the present method should not be difficult.

Tow vehicles and other transfer apparatus capable of moving aircraft on the ground substantially automatically or with minimal assistance and involvement from ground personnel are also available. The automated aircraft towing vehicle system described in U.S. Pat. No. 6,305,484 by LeBlanc, the disclosure of which is incorporated herein by reference, for example, has a towing tractor that is adapted for remote steering, acceleration, and braking control to move an aircraft on the ground to a desired location. Once the aircraft has reached the desired location, the tow vehicle is detached from the aircraft, which could be accomplished remotely, so that the aircraft can take off. An unmanned aircraft transfer system is described in U.S. Pat. No. 7,975,959 by Perry et al, the disclosure of which is incorporated herein by reference, and is controllable to move an aircraft on the ground. A transfer module moves the aircraft by skid steering, and control of this function is provided by one or more aircraft components. The transfer module is attached to the aircraft and then detached from the aircraft when it has reached a designated location. As with the use of a towing tractor, the aircraft's engines are not needed to move the aircraft with the aforementioned transfer module. Consequently, these and other available aircraft towing systems can be use without operation of an aircraft's main engines to move long haul aircraft on the ground to create additional long haul slots at curfew-controlled airports, particularly the sought-after slots near curfew times, and to increase the value of these long haul aircraft to an airline.

Figure 1:
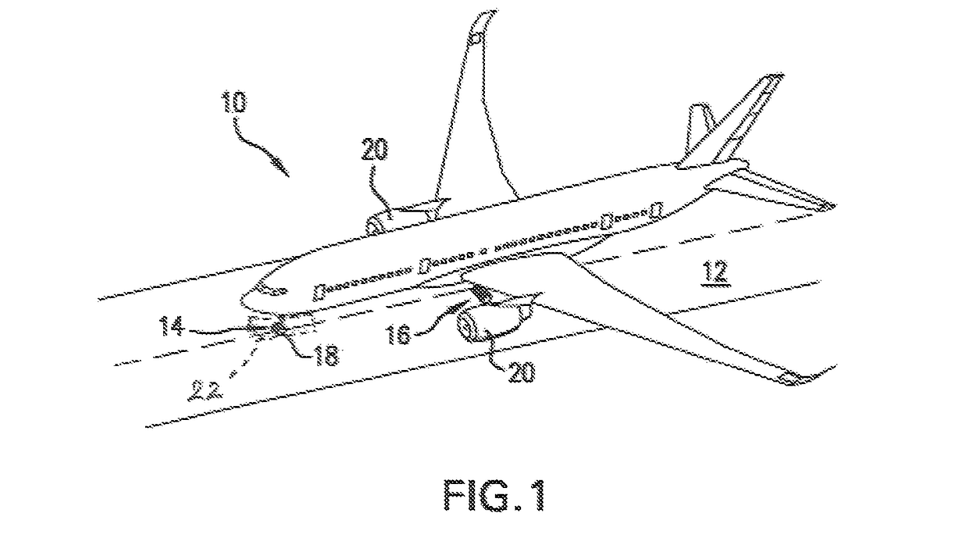
FIG. 1 is a perspective view of a long haul aircraft equipped with non-engine drive means for autonomous ground movement with a first early morning takeoff slot taxiing on a runway for takeoff prior to the expiration of curfew in accordance with the method of the present invention.
Figure 2:
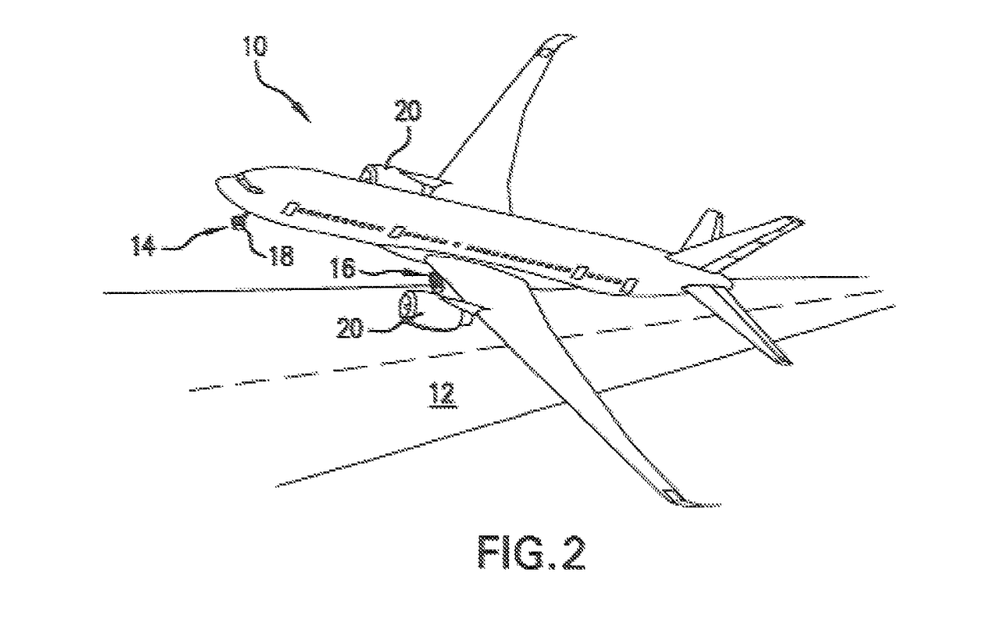
FIG. 2 is a perspective view of the long haul aircraft of FIG. 1 taking off just after the expiration of early morning curfew.

FIGS. 1 and 2 illustrate an aircraft 10 designed for long haul flights, such as, for example, a wide body aircraft, taxiing on a runway 12 prior to takeoff at the expiration of early morning curfew and in the process of taking off at the expiration of early morning curfew. FIG. 1 could also be viewed as showing aircraft 10 landing near the expiration of an evening or night curfew. The nose landing gear wheels 14 and one set of the main landing gear wheels 16 of the aircraft 10 can be seen. One or more onboard non-engine drive means, designated 18 near the nose wheels 14, may be provided to power and drive either or both of the nose wheels or one or more of the main landing gear wheels 16, making these wheels drive wheels capable of moving the aircraft autonomously, quietly, and efficiently on the ground without relying on thrust from the engines 20, one of which is visible. Alternatively, a manually or automatically operated tug, tow vehicle, or other transfer apparatus (not shown) shown schematically at 22, such as one those described above, could be used to move the long haul aircraft without engine operation to increase long haul slots and add value to operation of long haul aircraft as described herein.

In accordance with the present method for increasing value of operating a long haul aircraft by increasing airport long haul slots, whether long haul aircraft are equipped with onboard non-engine drive means for autonomous ground movement or moved by tow vehicles, the aircraft's engines 20 can be turned off very shortly after landing and can remain off until very shortly before takeoff, which significantly reduces noise and engine emissions and enables aircraft movement during an airport's curfew period. Substantially eliminating reliance on the use of the aircraft engines during autonomous taxi or assisted ground movement also reduces aircraft fuel consumption and eliminates the jet blast, engine ingestion, noise, and air pollution associated with operation of an aircraft's engines on the ground. Consequently, not only is a safer, quieter runway and ramp environment possible, but a long haul aircraft can proceed, autonomously or moved by a tow vehicle, very quietly and efficiently to a runway for takeoff and be ready for immediate takeoff when the curfew period is over in the early morning or immediately before the start of curfew at night. A long haul aircraft can also land at night and travel autonomously or be moved to a gate or other terminal parking location without significant noise or engine emissions, or the aircraft may land early in the morning immediately prior to or even after the end of curfew. The ability of a long haul aircraft to utilize these additional slots that are presently not available to long haul aircraft significantly increases the value of operating the aircraft to an airline. For each additional slot a long term haul aircraft can add at London Heathrow, for example, the value of the long haul aircraft to the airline may increase by about US$23 million or more, as indicated by a recent sale of slots.

Figure 3:
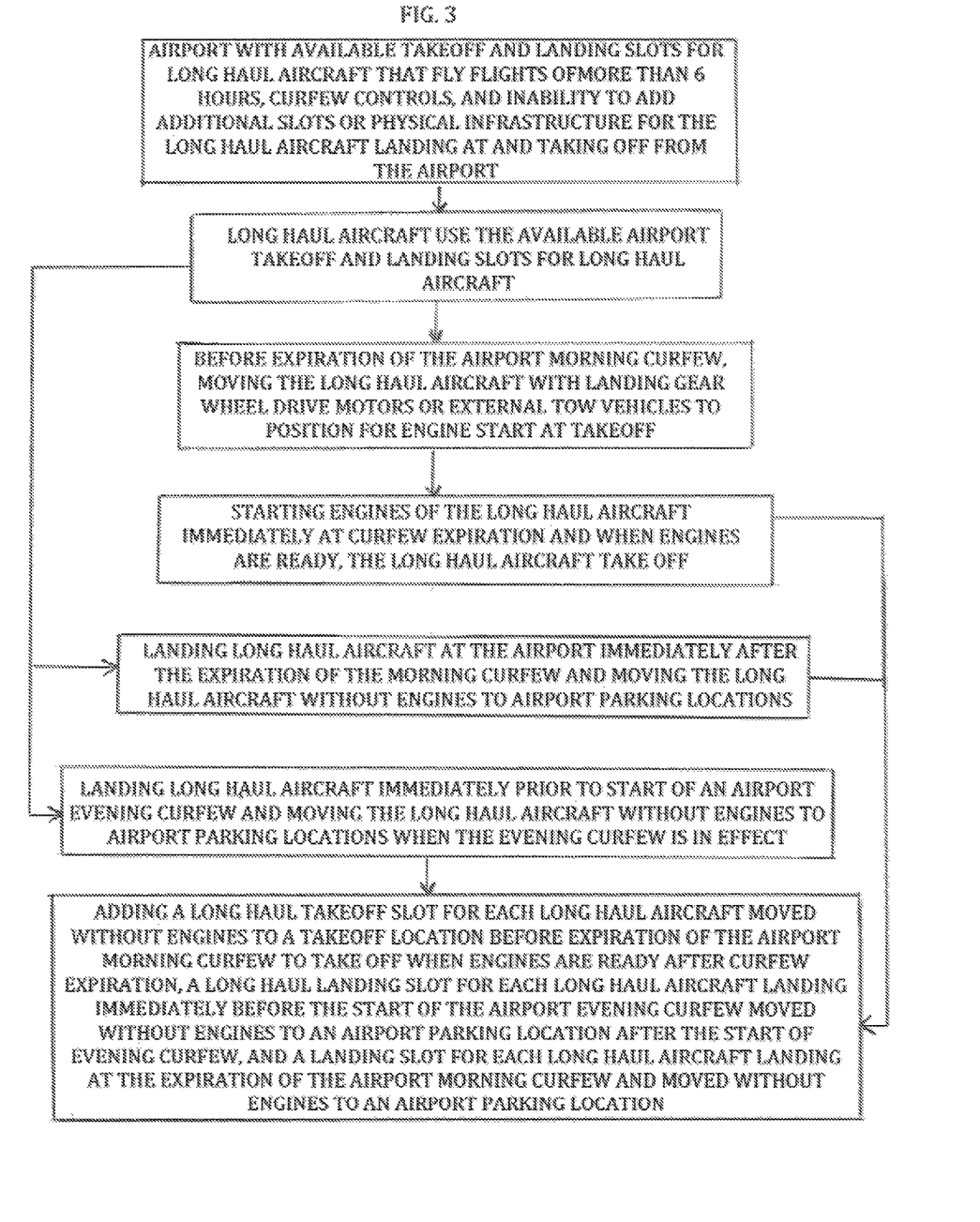
FIG. 3 is a flow chart with steps of the present method for increasing slots and adding value to long haul aircraft at airports that are curfew-controlled and are unable to add additional slots or increase physical infrastructure for long haul aircraft.

When a long haul aircraft is moved on the ground without operation of its engines, whether by being equipped with one or more onboard non-engine drive means or moved manually or automatically by a tow vehicle, such an aircraft is capable of effectively generating additional long haul slots by allowing earlier actual takeoffs and landings and increasing the number of takeoffs and landings possible compared to the number of takeoffs and landings possible at present. FIG. 3 sets forth the steps of present method for increasing the number of takeoff and landing slots for long haul aircraft at an airport where time of operation is limited by a curfew without adding physical infrastructure when the long haul aircraft are moved before takeoff and after landing without engines. FIG. 4 describes increasing arrival slots and departure slots for long haul and long haul widebody aircraft beyond the slots allocated by an airport to an airline for routinely operating long haul and long haul widebody aircraft when an airline desires to add additional landing and takeoff slots at an airport where demand exceeds airport infrastructure capacity and the airport curfew period limits the airline's time operation time for long haul and long haul widebody aircraft in accordance with the present method. The Example below demonstrates this.

Example

Airport with Curfew that Expires at 6:00 AM

Current Practice

All long haul aircraft are required to be at gates until 6:00 AM. At 6:00 AM, aircraft can be pushed back from gates with tugs or tow vehicles to reverse to a location where engines can be turned on and the aircraft moved forward to a takeoff runway, where aircraft line up awaiting takeoff. The earliest flight cannot be scheduled to depart until 6:15 AM or later. All long haul aircraft scheduled for the earliest slot must compete for available pushback tugs and ground crew. The earliest landing times available when curfew expires are among the most desirable, particularly at international airports for long haul aircraft that have been flying all night. Aircraft landing at that time may have a long wait for gates, which are filled with aircraft waiting to be pushed back or to turn on their engines and depart. Arriving aircraft may either be stacked in the air waiting for landing approval and/or on the ground waiting for gates, while departing aircraft are waiting for towing equipment and then what can be a mad dash for designated runways and takeoff.

With the Method of the Present Invention

Long haul aircraft equipped with onboard wheel non-engine drive means that autonomously control aircraft ground movement do not require operation of main engines or tugs and can taxi quietly to a takeoff runway prior to the expiration of 6:00 AM curfew, line up in position for takeoff, and be ready to start engines at 6:00 AM for a 6:05 AM departure. Long haul aircraft can also be moved quietly without engines by manually or automatically operated tow vehicles to a taxi runway and be ready to start engines and move into position for takeoff prior to the 6:00 AM curfew expiration.

Assuming 2 minutes per takeoff, 5 more onboard wheel non-engine drive means-equipped aircraft or aircraft externally assisted by tow vehicles can take off before the 6:15 AM earliest departure now possible, creating 5 additional slots per runway. Two runways used in this manner would produce 10 additional slots; four runways would produce 20 additional slots. At a busy airport like Heathrow where early morning takeoff slots are at a premium for long haul aircraft, each of the first five long haul aircraft per takeoff runway equipped with onboard non-engine drive means or moved by tow vehicles without engines as described herein to fly out of Heathrow after the expiration of morning curfew will realize an increase in value. The value added to the operation of each long haul aircraft that is able to obtain one of these first five early morning slots on each runway could reach about US$23 million per slot, or even more. Long haul aircraft that cannot be moved without engines to a takeoff runway will be required to wait until after the curfew period has expired for a pushback tug to depart the gate and be moved to a location where engines can be started.

At an airport with a 30 minute taxi time from the gate to a runway takeoff location, a long haul aircraft capable of ground movement without engines can leave the gate quietly at 5:30 AM, or even earlier if necessary, and be ready on the runway to start engines at 6:00 AM for a 6:05 AM takeoff. This frees gate space to load the next departing flight while the long haul aircraft with the 6:05 AM slot is on the runway. Assuming 2 minutes per takeoff and 3 runways, 30 additional takeoff events are created under this scenario without adding more gates. The addition of these 30 slots effectively adds 3 to 5 more gates to the airport with no additional infrastructure. At Heathrow, for example, each gate may have a worth that approaches about £3 million per year. This value may be significantly increased for landing aircraft.

Long haul aircraft capable of ground movement without engines, whether equipped with onboard non-engine drive means, towed, or moved in any other way, that arrive as soon as the morning curfew is lifted will be able to proceed directly to assigned gates upon landing since these gates have been vacated by the earlier departing long haul aircraft moved without engines and are available for the arriving long haul aircraft. The long haul landing slots created add additional value to the operation of these long haul aircraft. Additionally, significant time and expense savings should result from this efficient movement of long haul aircraft.

Once airports realize that aircraft engine noise between landing and the gate will be, at most, minimal, when long haul and other aircraft are moved without engines, the evening curfew starting time could be set to begin later than it is currently set. The elimination of noise pollution achieved by moving long haul, and other aircraft, without engines makes it possible to extend the commencement of the evening curfew, giving airports an estimated 30 minutes additional use of its facilities at the end of the day without any expansion of the airport's infrastructure. A later curfew generates increased evening landing slots, which is an additional way in which the value equated with these slots can be added to the operation of long haul aircraft.

When long haul aircraft are moved on the ground without operation of their engines in accordance with the present invention, this makes it possible for airlines that operate long haul aircraft to schedule earlier and later arrival and departure flight times than is currently possible. The number of possible takeoffs and landings of long haul aircraft in a set time period at an airport can be increased, effectively adding the value associated with these additional slots to the operation of these long haul aircraft.

While the present invention has been described with respect to preferred embodiments, this is not intended to be limiting, and other arrangements and structures that perform the required functions are contemplated to be within the scope of the present invention.

INDUSTRIAL APPLICABILITY

The present method for adding value to the operation of long haul aircraft by increasing the additional takeoff and landing slots possible at airports when long haul aircraft are moved on the ground without operation of aircraft engines will find its primary applicability when it is desired to expand the opportunities for airlines and airports to increase long haul flight scheduling capacity, particularly at airports that are slot-controlled and curfew-controlled, without adding additional infrastructure.

The invention claimed is:

1. A method that increases takeoff and landing slots allocated to an airline for operating long haul and long haul widebody aircraft by an airport where demand exceeds infrastructure capacity for increasing long haul takeoffs and landings and an airport curfew period limits the airline's operation time for long haul and long haul widebody aircraft, comprising:

a. allocating slots by an airport where demand exceeds infrastructure capacity to increase long haul and long haul wide body aircraft takeoffs and landings and an airport curfew period limits operation time to an airline for routine takeoffs and landings of the airline's long haul and long haul widebody aircraft flying flights of more than 6 hours in length at the airport;

b. equipping long haul and long haul widebody aircraft for which the airline desires to add takeoff and landing slots to the airport-allocated slots for routine takeoffs and landings to move on the ground without operating engines during the airport curfew period before takeoff and after landing with landing gear wheel-mounted drive motors selected from the group comprising electric motors, hydraulic pump/motor assemblies, and pneumatic motors capable of moving the long haul and long haul widebody aircraft at a desired speed and torque without operating aircraft engines retrofitted within each wheel in a pair of nose landing gear wheels on each long haul and long haul widebody aircraft, and moving the equipped long haul and long haul widebody aircraft on the ground with the landing gear wheel-mounted motors during the airport curfew period when aircraft ground movement, departures, and landings are not permitted at the airport;

c. moving each arriving equipped long haul and long haul widebody aircraft from a landing location to an airport parking location during the airport curfew period and adding an arrival slot to the routine arrival slots allocated to the airline for each equipped long haul and long haul widebody aircraft landing before the airport curfew period and moving from the arrival location to the parking location without operating engines during the airport curfew period; and d. moving each departing equipped long haul and long haul widebody aircraft from a parking location to a takeoff location during the airport curfew period and adding a departure slot to the routine departure slots allocated to the airline for each equipped long haul and long haul widebody aircraft moving from the parking location to the takeoff location without operating engines during the airport curfew period and taking off after the airport curfew period.

* * * * *